(12) United States Patent
Amici et al.

(10) Patent No.: US 12,043,108 B2
(45) Date of Patent: Jul. 23, 2024

(54) FUEL SUPPLY SYSTEM FOR A ROAD VEHICLE

(71) Applicant: FERRARI S.P.A., Modena (IT)

(72) Inventors: Marco Amici, Modena (IT);
Gianfranco Bastone, Modena (IT);
Alessandro Iobbi, Modena (IT);
Lorenzo Laraia, Modena (IT);
Lorenzo Tombari, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 18/329,253

(22) Filed: Jun. 5, 2023

(65) Prior Publication Data
US 2023/0398861 A1 Dec. 14, 2023

(30) Foreign Application Priority Data

Jun. 8, 2022 (IT) .................. 102022000012137

(51) Int. Cl.
| F02D 41/02 | (2006.01) |
| B60K 15/07 | (2006.01) |
| B60K 15/073 | (2006.01) |
| B60K 15/03 | (2006.01) |

(52) U.S. Cl.
CPC .......... *B60K 15/073* (2013.01); *F02D 41/021* (2013.01); *B60K 2015/03217* (2013.01); *B60K 2015/03243* (2013.01); *F02D 2200/0602* (2013.01)

(58) Field of Classification Search
CPC ....... F02D 41/02; F02D 41/021; B60K 15/07; B60K 15/073
See application file for complete search history.

(56) References Cited

U.S. PATENT DOCUMENTS

| 10,670,445 | B1 | 6/2020 | Heil et al. |
| 11,326,567 | B2 * | 5/2022 | Pintilie .............. F02M 37/0094 |
| 2004/0079149 | A1 * | 4/2004 | Sawert .................. G01F 23/296 |
| | | | 73/290 V |

(Continued)

FOREIGN PATENT DOCUMENTS

DE          10060239 A1    6/2002

OTHER PUBLICATIONS

Italian Search Report for Application No. 102022000012137; Filing Date: Jun. 8, 2022; Date of Mailing—Dec. 16, 2022, 8 pages.

*Primary Examiner* — Hai H Huynh
*Assistant Examiner* — Johnny H Hoang
(74) *Attorney, Agent, or Firm* — CANTOR COLBURN LLP

(57) ABSTRACT

A fuel supply system for a road vehicle and having: a fuel tank, which is shaped like saddle due to the presence of a central saddle and delimits an inner volume divided into an upper area, which is located above the central saddle, and two lower areas, which are located under the upper area and are separated from one another by the central saddle; two low-pressure fuel pumps, which each suck from the bottom of a corresponding lower area; at least one high-pressure fuel pump, which receives fuel from both low-pressure fuel pumps; a level sensor arranged in the upper area and configured to measure a fuel level only in the upper area; and two level sensors, each arranged in a respective lower area and configured to measure a fuel level only in the respective lower area.

21 Claims, 4 Drawing Sheets

(56) References Cited

U.S. PATENT DOCUMENTS

| | | | |
|---|---|---|---|
| 2007/0266762 A1* | 11/2007 | Rumpf | F02M 37/106 |
| | | | 73/1.73 |
| 2009/0178653 A1* | 7/2009 | Suda | B60K 15/00 |
| | | | 137/565.23 |
| 2010/0242923 A1 | 9/2010 | Okada et al. | |
| 2011/0181426 A1* | 7/2011 | Bucciero | G06K 19/0716 |
| | | | 340/612 |
| 2012/0167676 A1* | 7/2012 | Bucciero | H04Q 9/00 |
| | | | 73/290 V |
| 2015/0114100 A1* | 4/2015 | Ikeya | B60K 35/00 |
| | | | 73/114.54 |
| 2015/0177048 A1* | 6/2015 | Hirahara | G01F 23/38 |
| | | | 73/311 |
| 2015/0285669 A1* | 10/2015 | Manabe | G01F 23/38 |
| | | | 73/311 |
| 2017/0051701 A1* | 2/2017 | Pursifull | F02M 37/06 |
| 2018/0135574 A1* | 5/2018 | Pearce | F02M 37/50 |
| 2018/0320648 A1* | 11/2018 | Fischer | F02M 37/18 |

* cited by examiner

FUEL SUPPLY SYSTEM FOR A ROAD VEHICLE

CROSS-REFERENCE TO RELATED APPLICATIONS

This patent application claims priority from Italian patent application no. 102022000012137 filed on Jun. 8, 2022, the entire disclosure of which is incorporated herein by reference.

TECHNICAL FIELD

The present invention relates to a fuel supply system for a road vehicle.

PRIOR ART

A road vehicle provided with an internal combustion engine is also equipped with a fuel supply system which supplies fuel under pressure to the internal combustion engine. The fuel supply system comprises a fuel tank from which a (at least one) low-pressure fuel pump sucks which is operated by an electric motor and supplies a high-pressure fuel pump.

Generally, the fuel tank is arranged at the bottom immediately behind the passenger compartment (in order to be suitably protected from impacts and in order not to exceedingly penalise the management of the spaces inside the road vehicle); consequently, when the internal combustion engine is arranged in front position, the lower wall of the fuel tank frequently has a central saddle (hump, projection) necessary for allowing the passage of a transmission shaft (in case of rear drive) and of an exhaust pipe. An inner volume of the fuel tank is thus divided into three distinct areas: an upper area, which is located above the central saddle, and two lower areas, which are located immediately under the upper area and are separated from one another by the central saddle (i.e. the two lower areas do not communicate with one another directly but only through the upper area).

In order to allow the two lower areas to communicate with one another directly (so as to enable the fuel to flow between the two lower areas without compulsorily passing from the upper area) a connection pipe is normally provided which puts the two lower areas in hydraulic communication. In this manner, the fuel is free to be distributed in both lower areas following transversal accelerations which occur while driving (particularly, driving on track where the transversal accelerations continuously follow one another and are very high).

The presence of the connection pipe which puts the two lower areas of the fuel tank in hydraulic communication has some drawbacks, as it increases the (undesired) emissions of hydrocarbon vapours (homologation regulations are increasingly stricter on the maximum emission limits of hydrocarbon vapours); in particular, the connections of the two ends of the connection pipe to the two sides of the fuel tank have the greatest impact on the total emissions of hydrocarbon vapours of the connection pipe. Furthermore, the presence of the connection pipe makes the access to the area located under the fuel tank more difficult. Furthermore, the connection pipe inevitably has a lower mechanical resistance with respect to the mechanical resistance of the fuel tank and thus following a road accident it can be damaged causing fuel leakages. The connection pipe has to be removed for allowing the disassembly of the gearbox obliging a pre-emptive emptying of the fuel tank. Finally, the presence of the connection pipe increases the number of components contained in the fuel supply system, thus increasing possible mounting problems.

However, the elimination of the connection pipe which puts the two lower areas of the fuel tank in hydraulic communication makes the determination of the quantity of fuel present in the fuel tank less precise (since in the two lower areas no longer directly connected to one another there can be fuel levels which are also very different from one another). Furthermore, the elimination of the connection pipe which puts the two lower areas of the fuel tank in hydraulic communication makes the presence of two low-pressure fuel pumps compulsory, each of which sucks from the bottom of a corresponding lower area; however, in the absence of the connection pipe it is very complicated to correctly balance the flow rates of the two low-pressure fuel pumps.

Patent applications US2010242923A1 and DE10060239A1e describe a fuel supply system for an internal combustion engine in which a fuel tank having a central saddle (hump, projection) is provided.

DESCRIPTION OF THE INVENTION

The object of the present invention is to provide a fuel supply system for a road vehicle which is devoid of the above-described drawbacks, i.e. allows determining with precision the quantity of fuel present in the fuel tank and allows correctly balancing the flow rates of the two low-pressure fuel pumps also in the absence of the connection pipe which puts the two lower areas of the fuel tank in hydraulic communication.

According to the present invention, a fuel supply system for a road vehicle is provided, according to what claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
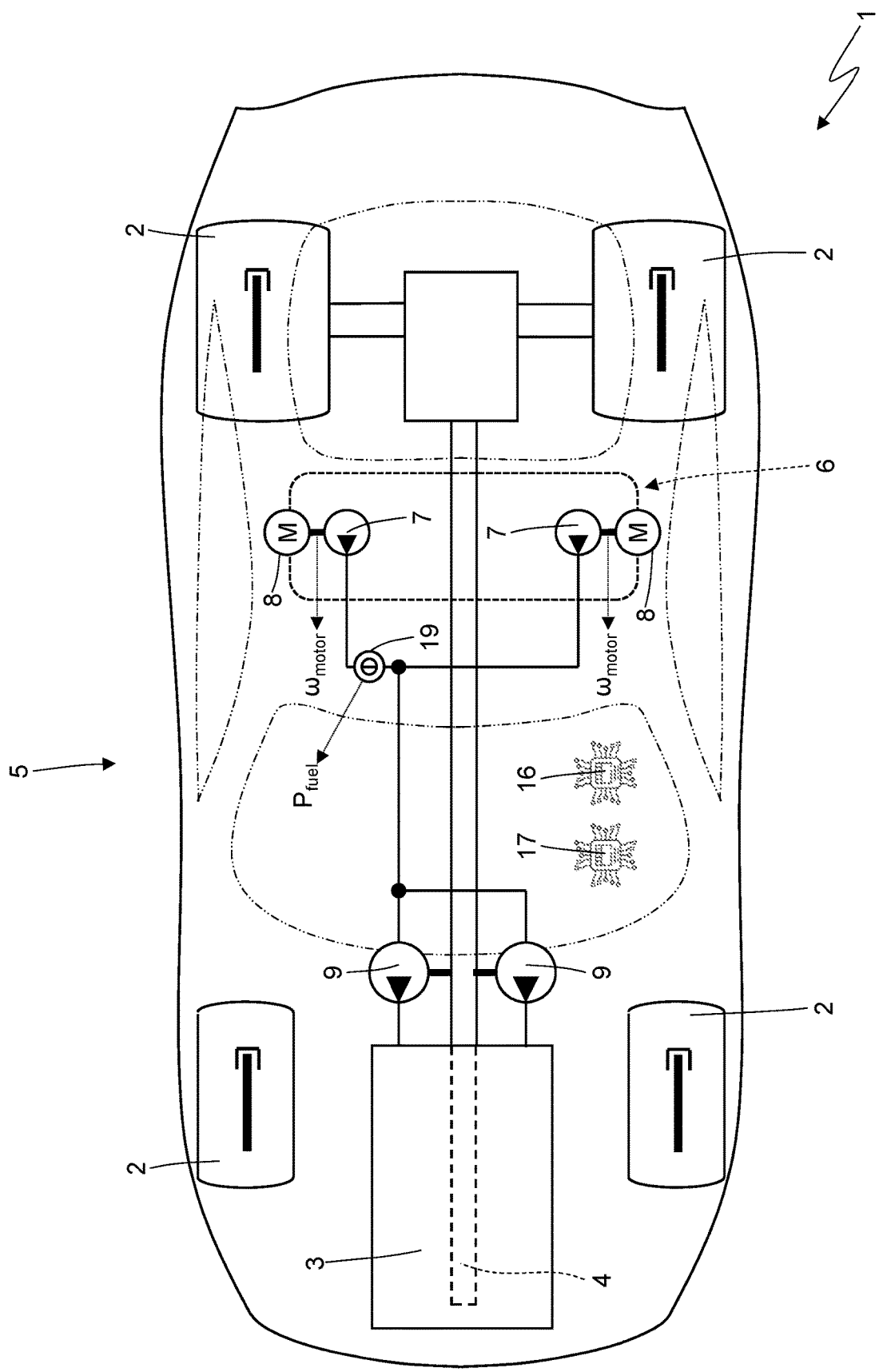
FIG. 1 is a schematic plan view of a road vehicle provided with a fuel supply system object of the present invention.

In FIG. 1, reference numeral 1 indicates, as a whole, a road vehicle provided with two front wheels 2 and two rear drive wheels 2 which receive the torque from a powertrain system. The powertrain system comprises an internal combustion engine 3 equipped with a drive shaft 4 to which a series of pistons are connected which alternatively slide in corresponding cylinders.

The internal combustion engine 3 is equipped with a fuel supply system 5 comprising a fuel tank 6 from which two low-pressure fuel pumps 7, which are twin pumps, suck and are operated by corresponding electric motors 8. Furthermore, the fuel supply system 5 comprises two high-pressure fuel pumps 9, which are twin pumps, which are (directly or indirectly) operated by the drive shaft 4, supply fuel to the injectors which inject fuel into the cylinders and receive fuel by both low-pressure fuel pumps 7. In other words, the deliveries of the two low-pressure fuel pumps 7 join in a single supply duct which ends in the suctions of the high-pressure fuel pumps 9.

Figure 2:
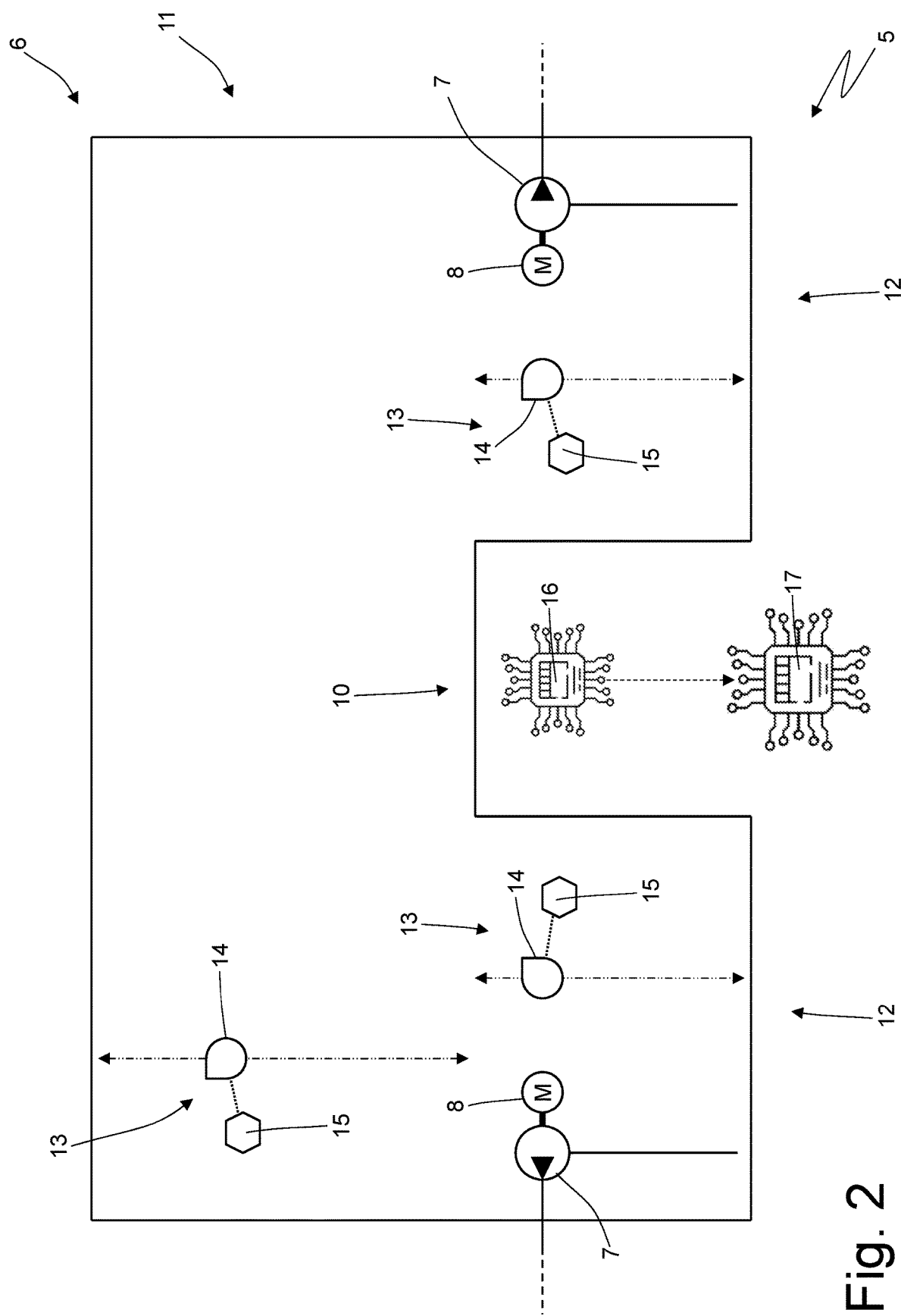
FIG. 2 is a schematic view of a fuel tank of the fuel supply system of FIG. 1.

According to what is illustrated in FIG. 2, the fuel tank 6 is shaped like saddle due to the presence of a central saddle (hump, projection) 10 necessary for allowing the passage of a transmission shaft and of an exhaust pipe. Consequently, an inner volume of the fuel tank 6 is divided into three distinct areas 11 and 12: an upper area 11, which is located above the central saddle 10 and two lower areas 12, which are located immediately under the upper area 11 and are separated from one another by the central saddle 10 (the two lower areas 12 do not communicate with one another directly but only through the upper area 11). In other words, the two lower areas 12 communicate with one another only and exclusively through the upper area 11, since there is not direct connection between the two lower areas 12 on the outside of the fuel tank 6.

Each low-pressure fuel pump 7 is coupled to a corresponding lower area 12, i.e. sucks in the proximity of a bottom wall of the corresponding lower area 12.

Three level sensors 13 are coupled to the fuel tank 6, each level sensor 13 is adapted to measure a fuel level. In particular, each area 11 or 12 comprises a corresponding level sensor 13 and thus a level sensor 13 is arranged in the upper area 11 for measuring the fuel level in the upper area 11 and the other two level sensors 13 are each arranged in a corresponding lower area 12 for measuring the fuel level in the corresponding lower area 12.

Each level sensor 13 comprises its own float 14, which is free to vertically move along the entire extension of its area 11 or 12 (as is indicated by the double arrow superimposed on each float 14) and a position transducer 15, which is mechanically connected to the float 14 and is configured to provide a signal, which is electrically readable and changes as the vertical position of the float 14 changes. According to a possible embodiment, each position transducer 15 is of resistive type (i.e. is a rheostat) and thus changes its electric resistance as the vertical position of the corresponding float 14 changes.

The supply system 5 comprises a control unit 16 which is connected to the three level sensors 13 (in particular to the position transducers 15 of the three level sensors 13) and a control unit 17 which controls the electric motors 8 of the two low-pressure fuel pumps 7.

According to a preferred embodiment, the control unit 16 is configured to pre-emptively apply to the raw signals R1, R2, R3 (schematically illustrated in FIG. 3) provided by the three level sensors 13 (i.e. to the resistance values which the control unit 16 reads in the three resistive position transducers 15) a linearisation, which transforms the raw signals R1, R2, R3 provided by the three level sensors 13 into corresponding filling percentages F1, F2, F3 (i.e. into a value from 0% to 100% which indicates how full the corresponding area 11 or 12 is). In particular, the control unit 16 is configured to apply the linearisation by means of a conversion table $T_A$ (illustrated in FIG. 4) which is inputted with the raw signal R1, R2, R3 coming from each level sensor 13 and outputs a corresponding filling percentage F1, F2, F3 (generally each level sensor 13 is associated with a corresponding "customised" conversion table $T_A$).

The control unit 16 is configured to calculate the total fuel quantity FF present in the entire fuel tank 6 (information which is signalled to the driver in the control panel 18) by adding up three fuel quantities present in the three areas 11 and 12 and determined depending on the signals provided by the three level sensors 13; in particular, the control unit 16 is configured to calculate the total fuel quantity FF present in the entire fuel tank 6 by means of a combination (for example linear or polynomial) of the signals provided by the three level sensors 13; in other words, the three signals provided by the three level sensors 13 (as mentioned in the foregoing, pre-emptively linearised for becoming the corresponding filling percentages F1, F2, F3) are combined with (added up to) one another after being multiplied by corresponding weights utilising, for example, an equation of this type (obviously, also other equations could be utilised):

$$FF = A*F1 + B*F2 + C*F3$$

FF total fuel quantity present in the entire fuel tank 6;
A,B,C numeric weights;
F1,F2,F3 filling percentages F of the three areas 11 and 12.

According to a preferred embodiment, the control unit 16 is configured to pre-emptively apply a time filter of the low-pass type (having a rather definite intervention) to the signals provided by the three level sensors 13 before utilising the signals provided by the three level sensors 13 for establishing a fuel quantity present in the entire fuel tank 6; this low-pass filter can be applied before or after the linearisation of the signals provided by the three level sensors 13. The purpose of the low-pass filter is to eliminate the exceedingly quick (fast) variations of the signals provided by the three level sensors 13 clearly caused by temporary dynamic phenomena.

Figure 3:
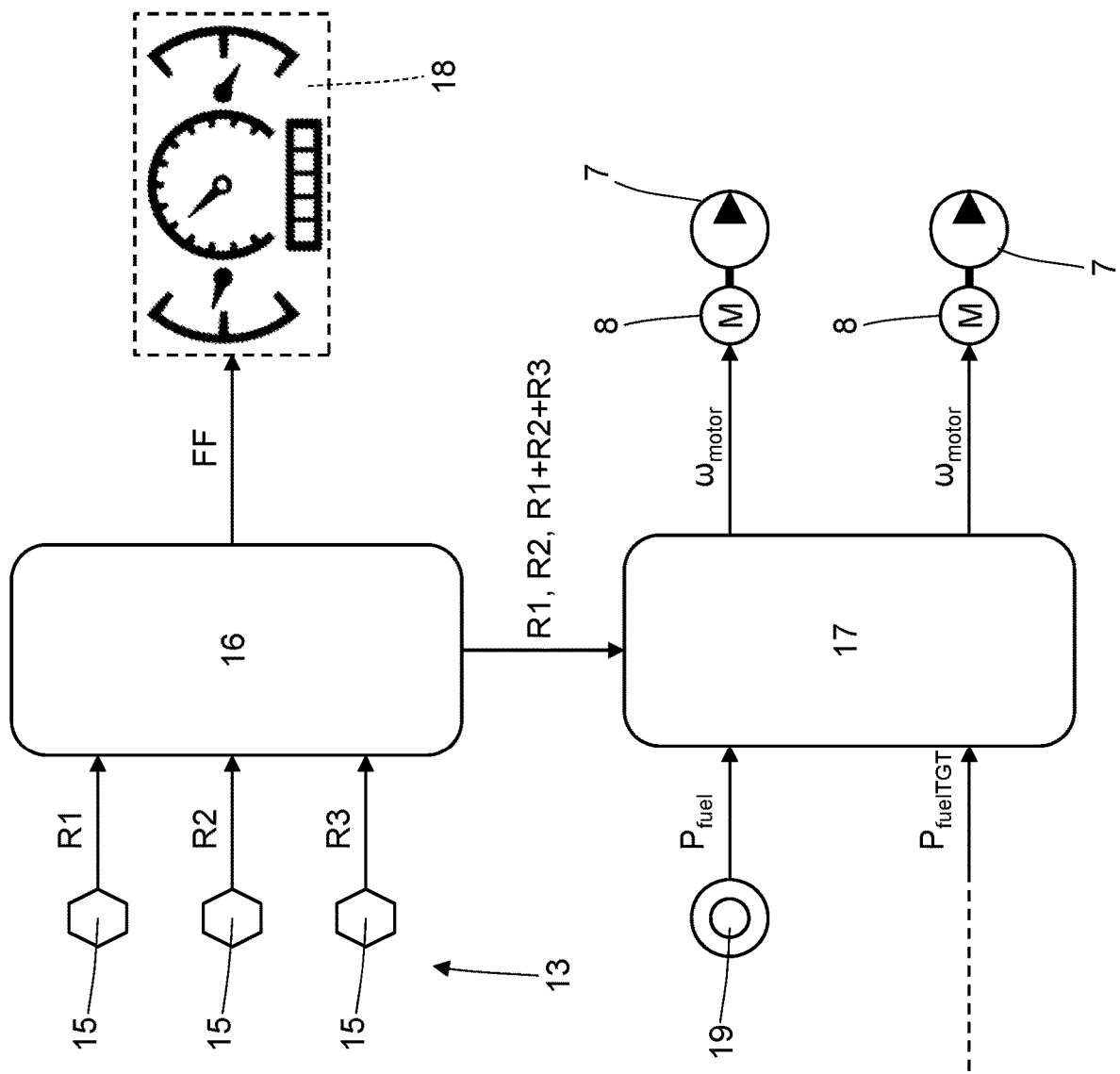
FIG. 3 is a schematic view of two control units of the fuel supply system of FIG. 1.
Figure 4:
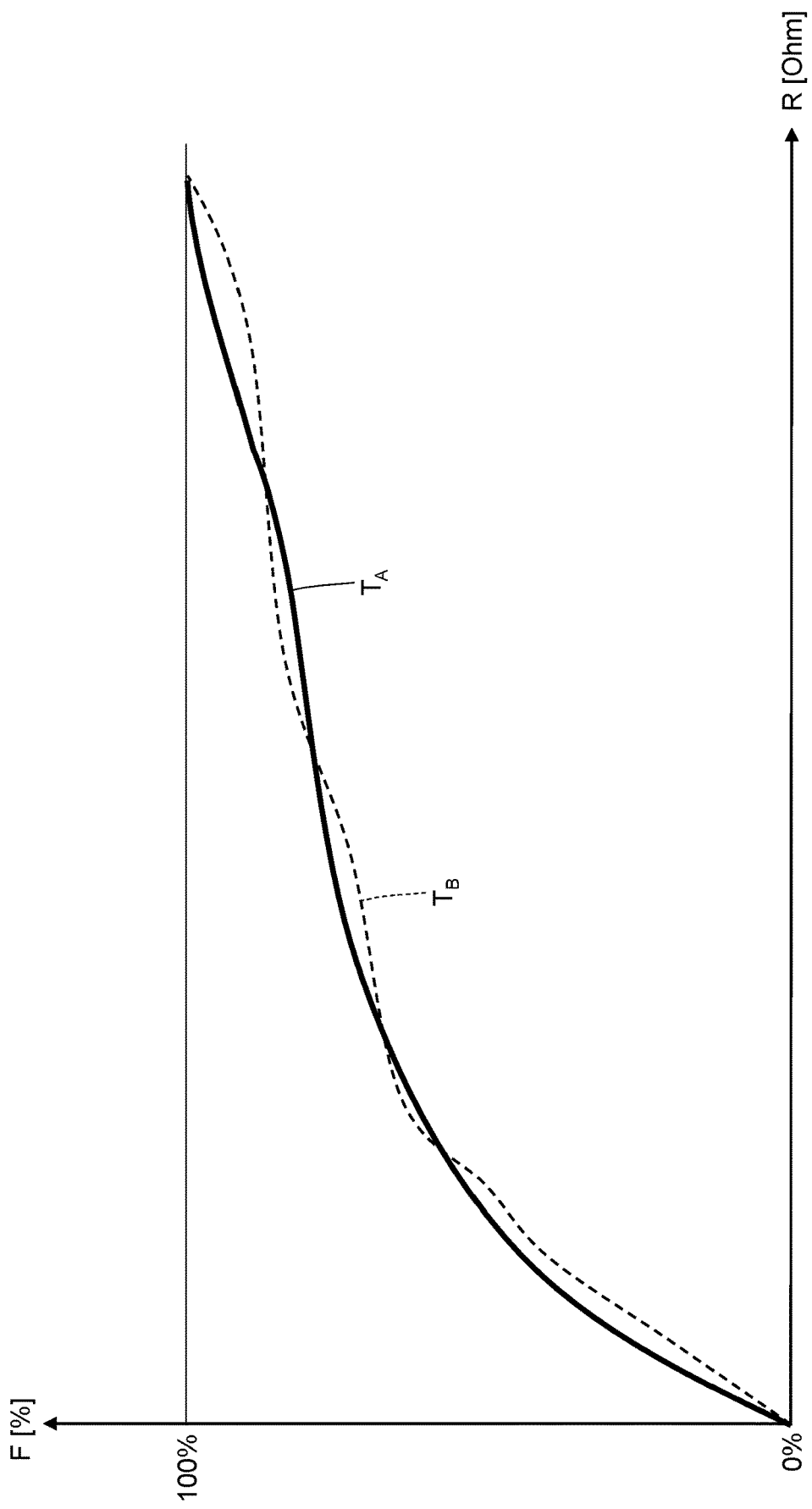
FIG. 4 is a diagram showing two laws of linearisation utilised by the two control units of the fuel supply system of FIG. 1.

According to what is illustrated in FIG. 3, the control unit 17 receives from a control unit of the internal combustion engine 3 (or alternatively determines autonomously) a target (objective) fuel pressure $P_{fuelTGT}$ exiting both low-pressure fuel pumps 7 (i.e. entering the high-pressure fuel pumps 9) and thus determines a rotation speed $\omega_{motor}$ of the electric motors 8 of the two low-pressure fuel pumps 7 depending on the target fuel pressure $P_{fuelTGT}$ (i.e. to pursue the target fuel pressure $P_{fuelTGT}$). In other words, the target fuel pressure $P_{fuelTGT}$ is set and thus the two low-pressure fuel pumps 7 (i.e. the respective electric motors 8) are controlled to pursue the target fuel pressure $P_{fuelTGT}$. Preferably, the control unit 17 is configured to control, through feedback, the rotation speed $\omega_{motor}$ of the electric motors 8 of the two low-pressure fuel pumps 7 to pursue the target fuel pressure $P_{fuelTGT}$ using as feedback variable the fuel pressure $P_{fuel}$ measured by a pressure sensor 19 arranged downstream of the two low-pressure pumps 7 (more or less close to the two low-pressure pumps 7).

According to a preferred embodiment illustrated in FIG. 3, the control unit 17 is inputted with the raw signals R1 and R2 of the level sensors 13 arranged in the two lower areas 12 and the sum R1+R2+R3 of the three signals R1, R2, R3 of the three level sensors 13. The control unit 17 is configured to pre-emptively apply to the raw signals R1, R2, R1+R2+R3 received from the control unit 16 (and provided by the three level sensors 13) a linearisation which transforms the raw signals R1, R2, R1+R2+R3 provided by the three level sensors 13 into corresponding filling percentages F1, F2, F1+F2+F3. In particular, the control unit 17 is configured to apply the linearisation by means of a conversion table $T_B$ (illustrated in FIG. 4) which is inputted with the raw signal R1, R2, R1+R2+R3 coming from each level sensor 13 and outputs a corresponding filling percentage F1, F2, F1+F2+F3 (generally each raw signal R1, R2, R1+R2+R3 is associated with a corresponding "customised" conversion table $T_B$).

The conversion table $T_B$ utilised by the control unit 17 is different from the conversion table $T_A$ utilised by the control unit 16 since the objectives of the two control units 16 and 17 are different: the control unit 16 has to determine the actual fuel quantity present inside the fuel tank 6 in static conditions (i.e. eliminating the effects of the accelerations to which the road vehicle 1 is subjected), whereas the control unit 17 has to know the instantaneous position in dynamic conditions of the fuel inside the fuel tank 6 in order to be able to establish how to control the two low-pressure fuel pumps 7.

Unlike the conversion table $T_A$, the conversion table $T_B$ is variable (parametrised) depending on the lateral (transversal) acceleration and on the longitudinal acceleration to which the fuel tank 6 (i.e. the road vehicle) is subjected so as to change the law $T_B$ of conversion as the lateral acceleration and the longitudinal acceleration change. Preferably, the variation (parametrisation) of the conversion table $T_B$ takes into account both the absolute value of the lateral and longitudinal accelerations and the direction of the lateral and longitudinal accelerations. In other words, the law $T_B$ of conversion changes in a (also remarkably) different manner depending on whether the same absolute value of the lateral acceleration is directed towards right or towards left (since the position of the position sensors 13 and the shape of the fuel tank 6 are not perfectly symmetrical with respect to the longitudinal centre line and thus a lateral acceleration towards right locally produces effects different from the same lateral acceleration towards left). Similarly, the law $T_B$ of conversion changes in a (also remarkably) different manner depending on whether the same absolute value of the longitudinal acceleration determines an increase in the advancement speed or a reduction in the advancement speed.

The control unit 17 utilises the raw signals R1, R2, R3 of the three level sensors 13 for determining a fuel quantity present in each lower area 12 of the fuel tank 6 and on the basis of the fuel quantity present in each lower area 12 it establishes the mode with which to control the two low-pressure fuel pumps 7.

When the total fuel quantity FF present inside the fuel tank 6 exceeds a high threshold, then the control unit 17 cyclically repeats an activation sequence, which consists of four steps and entails activating one single low-pressure fuel pump 7 for a first amount of time (for example 30 seconds), then activating, for a second amount of time (generally smaller than the first amount of time, for example 10 seconds), both low-pressure fuel pumps 7, then activating the other low-pressure fuel pump 7 for the first amount of time (for example 30 seconds), and finally activating again, for the second amount of time (for example 10 seconds), both low-pressure fuel pumps 7.

When the total fuel quantity FF present inside the fuel tank 6 is smaller than the high threshold and exceeds a low threshold (i.e. is comprised between the high threshold and the low threshold) then the control unit 17 determines in which lower area 12 there is more fuel and thus always activates only the low-pressure fuel pump 7 arranged in the lower area 12 in which there is more fuel.

When the total fuel quantity FF present inside the fuel tank 6 is smaller than the low threshold, then the control unit 17 determines in which lower area 12 there is still fuel and thus always activates only the low-pressure fuel pump 7 arranged in the lower area 12 in which there is still fuel.

In other words, the control unit 17 is configured to determine whether in both lower areas 12 there is fuel and to turn on (utilise) both low-pressure fuel pumps 7 only if fuel is present in both lower areas 12.

In any condition, the control unit 17 controls the active low-pressure fuel pump 7 (or the active low-pressure fuel pumps 7) adjusting the rotation speed $\omega_{motor}$ of the electric motors 8 to pursue the target fuel pressure $P_{fuelTGT}$ using as feedback variable the fuel pressure $P_{fuel}$ measured by the pressure sensor 19.

Preferably, the control unit 17 is configured to request a limitation of the performances of an internal combustion engine 3 receiving fuel from the fuel supply system 5, if fuel is present only in a lower area 12 (therefore, it is not possible to access both low-pressure fuel pumps 7) and the fuel pressure $P_{fuel}$ measured by the pressure sensor 19 is below a limit value.

The above-described fuel supply system 5 has numerous advantages.

Firstly, the above-described fuel supply system 5 allows eliminating the connection pipe between the two lower areas 12 of the fuel tank 6 with all the advantages deriving from this elimination without, on the other hand, having any type of penalisation.

In fact, the above-described fuel supply system 5 allows determining with extreme precision the total fuel quantity present in the entire fuel tank 6.

Furthermore, the above-described fuel supply system 5 allows controlling in an effective and efficient manner the two low-pressure fuel pumps 7 preventing a low-pressure fuel pump 7 from operating empty (i.e. without the possibility of sucking fuel) and always (as much as physically possible) guaranteeing that the target fuel pressure $P_{fuelTGT}$ will enter the high-pressure fuel pumps 9.

Finally, the fuel supply system 5 is simple and cost-effective to implement since it does not require either a great calculation power, or a high memory occupation and it does not require the addition of expensive components.

LIST OF THE REFERENCE NUMERALS OF THE FIGURES 1 road vehicle
2 wheel
3 internal combustion engine
4 drive shaft
5 fuel supply system
6 fuel tank
7 low-pressure fuel pump
8 electric motor
9 high-pressure fuel pump
10 central saddle
11 upper area
12 lower area
13 level sensor
14 float
15 transducer
16 control unit
17 control unit
18 control panel
19 position sensor
$T_A$ conversion table
$T_B$ conversion table
F filling percentage
R raw signal
FF total fuel quantity
$P_{fuel}$ fuel pressure $P_{fuelTGT}$ target fuel pressure
$\omega_{motor}$ rotation speed

The invention claimed is:

1. A fuel supply system (5) for a road vehicle (1) and comprising:
  a fuel tank (6), which presents a central saddle (10 and is shaped like a saddle and delimits an inner volume divided into an upper area (11), which is located above the central saddle (10), and two lower areas (12), which are located under the upper area (11) and are separated from one another by the central saddle (10);
  two low-pressure fuel pumps (7), which are twin pumps, are operated by corresponding electric motors (8) and each suck from the bottom of a corresponding lower area (12);
  at least one high-pressure fuel pump (9), which receives fuel from both low-pressure fuel pumps (7);
  a first control unit (17), which is configured to control the electric motors (8) of the two low-pressure fuel pumps (7);
  a first level sensor (13) arranged in the upper area (11) and is configured to measure a fuel level only in the upper area (11); and
  two second level sensors (13), each arranged in a respective lower area (12) and configured to measure a fuel level only in the respective lower area (12);
  wherein the two lower areas (12) communicate with one another only and exclusively through the upper area (11), since there is not direct connection between the two lower areas (12) on the outside of the fuel tank (6),
  wherein the first control unit (17) is configured to: determine a total fuel quantity (FF) present inside the fuel tank (6); activate, at least for a given amount of time, both low-pressure fuel pumps (7), if the total fuel quantity (FF) exceeds a threshold; and always activate one single low-pressure fuel pump (7) at a time, if the total fuel quantity (FF) is smaller than the threshold.

2. The fuel supply system (5) according to claim 1, wherein each level sensor (13) comprises a float (14), which is free to vertically move along an entire extension of its area (11, 12), and a transducer (15), which is mechanically connected to the float (14) and is configured to provide a signal, which is electrically readable and changes as the vertical position of the float (14) changes.

3. The fuel supply system (5) according to claim 1, wherein the first control unit (17) is configured to pre-emptively apply, to raw signals (R) provided by the three level sensors (13), a linearisation, which transforms the raw signals (R) provided by the three level sensors (13) into corresponding filling percentages (F).

4. The fuel supply system (5) according to claim 3, wherein the first control unit (17) is configured to apply the linearisation by means of a conversion table (TB), which is inputted with the raw signal (R) coming from each level sensor (13) and outputs a corresponding filling percentage (F).

5. The fuel supply system (5) according to claim 4, wherein the conversion table (TB) is variable depending on a lateral acceleration and on a longitudinal acceleration to which the fuel tank (6) is subjected, so as to change a law of conversion as the lateral acceleration and the longitudinal acceleration change.

6. The fuel supply system (5) according to claim 5, wherein the change in the conversion table (TB) takes into account both the absolute value of the lateral acceleration and of the longitudinal acceleration and the direction of the lateral acceleration and of the longitudinal acceleration.

7. The fuel supply system (5) according to claim 1, wherein a second control unit (16) is configured to calculate a fuel quantity (FF) present in the entire fuel tank (6) by means of a combination of signals provided by the three level sensors (13).

8. The fuel supply system (5) according to claim 1, wherein the first control unit (17) is configured to:
  establish a target fuel pressure ($P_{fuelTGT}$) downstream of the low-pressure fuel pumps (7); and
  determine a rotation speed ($\omega_{motor}$) of the electric motors (8) of the two low-pressure fuel pumps (7) depending on the target fuel pressure ($P_{fuelTGT}$).

9. The fuel supply system (5) according to claim 8, wherein the first control unit (17) is configured to control, through feedback, the rotation speed ($\omega_{motor}$) of the electric motors (8) of the two low-pressure fuel pumps (7) using, as feedback variable, a fuel pressure ($P_{fuel}$) measured by a pressure sensor (19) arranged downstream of the low-pressure fuel pumps (7).

10. The fuel supply system (5) according to claim 1, wherein the first control unit (17), when the total fuel quantity (FF) exceeds the threshold, is configured to cyclically repeat an activation sequence, which consists of four steps and entails activating one single low-pressure fuel pump (7) for a first amount of time, then activating, for a second amount of time, both low-pressure fuel pumps (7), then activating the other low-pressure fuel pump (7) for the first amount of time, and finally activating again, for the second amount of time, both low-pressure fuel pumps (7).

11. The fuel supply system (5) according to claim 10, wherein the second amount of time is smaller than the first amount of time.

12. The fuel supply system (5) according to claim 1, wherein the first control unit (17), when the total fuel quantity (FF) is smaller than the threshold, is further configured to:
  determine the lower area (12) where there is the larger quantity of fuel; and
  always turn on the sole low-pressure fuel pump (7) associated with the lower area (12) where there is the larger quantity of fuel.

13. The fuel supply system (5) according to claim 1, wherein the first control unit (17) is configured to:
  determine whether there is fuel in both lower areas (12); and
  turn on both low-pressure pumps (7), only if there is fuel in both lower areas (12).

14. The fuel supply system (5) according to claim 1, wherein the first control unit (17) is configured to request a limitation of performances of an internal combustion engine (3) receiving fuel from the fuel supply system (5), if there is fuel only in a lower area (12) and a fuel pressure ($P_{fuel}$) measured by pressure sensor (19) downstream of the low-pressure fuel pumps (7) is below a limit value.

15. The fuel supply system (5) according to claim 1 and comprising a second control unit (16), which is directly connected to the level sensors (13) and communicates the signals provided by the level sensors (13) to the first control unit (17).

16. The fuel supply system (5) according to claim 15, wherein the second control unit (16) is configured to:
  calculate a total fuel quantity (FF) present in the entire fuel tank (6); and
  communicate the total fuel quantity (FF) to a control panel (18).

17. A method to control the fuel supply system (5) according to claim 1 and comprising the steps of:

measuring a fuel level only in the upper area (11) by means of the first level sensor (13); and measuring a fuel level only in each lower area (12) by means of the corresponding second level sensor (13).

18. A fuel supply system (5) for a road vehicle (1) and comprising:
- a fuel tank (6), which presents a central saddle (10) and thus is shaped like saddle and delimits an inner volume divided into an upper area (11), which is located above the central saddle (10), and two lower areas (12), which are located under the upper area (11) and are separated from one another by the central saddle (10);
- two low-pressure fuel pumps (7), which are twin pumps, are operated by corresponding electric motors (8) and each suck from the bottom of a corresponding lower area (12);
- at least one high-pressure fuel pump (9), which receives fuel from both low-pressure fuel pumps (7);
- a control unit (17), which is configured to control the electric motors (8) of the two low-pressure fuel pumps (7);
- a first level sensor (13) arranged in the upper area (11) and is configured to measure a fuel level only in the upper area (11); and
- two second level sensors (13), each arranged in a respective lower area (12) and configured to measure a fuel level only in the respective lower area (12);
- wherein the two lower areas (12) communicate with one another only and exclusively through the upper area (11), since there is not direct connection between the two lower areas (12) on the outside of the fuel tank (6);
- wherein the control unit (17) is configured to pre-emptively apply, to raw signals (R) provided by the three level sensors (13), a linearisation, which transforms the raw signals (R) provided by the three level sensors (13) into corresponding filling percentages (F);
- wherein the control unit (17) is configured to apply the linearisation by means of a conversion table (TB), which is inputted with the raw signal (R) coming from each level sensor (13) and outputs a corresponding filling percentage (F);
- wherein the conversion table (TB) is variable depending on a lateral acceleration and on a longitudinal acceleration to which the fuel tank (6) is subjected, so as to change a law of conversion as the lateral acceleration and the longitudinal acceleration change.

19. The fuel supply system (5) according to claim 18, wherein the change in the conversion table (TB) takes into account both the absolute value of the lateral acceleration and of the longitudinal acceleration and the direction of the lateral acceleration and of the longitudinal acceleration.

20. A fuel supply system (5) for a road vehicle (1) and comprising:
- a fuel tank (6), which presents a central saddle (10) and thus is shaped like saddle and delimits an inner volume divided into an upper area (11), which is located above the central saddle (10), and two lower areas (12), which are located under the upper area (11) and are separated from one another by the central saddle (10);
- two low-pressure fuel pumps (7), which are twin pumps, are operated by corresponding electric motors (8) and each suck from the bottom of a corresponding lower area (12);
- at least one high-pressure fuel pump (9), which receives fuel from both low-pressure fuel pumps (7);
- a control unit (17), which is configured to control the electric motors (8) of the two low-pressure fuel pumps (7);
- a first level sensor (13) arranged in the upper area (11) and is configured to measure a fuel level only in the upper area (11); and
- two second level sensors (13), each arranged in a respective lower area (12) and configured to measure a fuel level only in the respective lower area (12);
- wherein the two lower areas (12) communicate with one another only and exclusively through the upper area (11), since there is not direct connection between the two lower areas (12) on the outside of the fuel tank (6);
- wherein the control unit (17) is configured to: establish a target fuel pressure ($P_{fuelTGT}$) downstream of the low-pressure fuel pumps (7); and determine a rotation speed ($\omega_{motor}$) of the electric motors (8) of the two low-pressure fuel pumps (7) depending on the target fuel pressure ($P_{fuelTGT}$).

21. The fuel supply system (5) according to claim 20, wherein the control unit (17) is configured to control, through feedback, the rotation speed ($\omega_{motor}$) of the electric motors (8) of the two low-pressure fuel pumps (7) using, as feedback variable, a fuel pressure ($P_{fuel}$) measured by a pressure sensor (19) arranged downstream of the low-pressure fuel pumps (7).

* * * * *